US012731363B2

(12) United States Patent
Hareendranath et al.

(10) Patent No.: US 12,731,363 B2
(45) Date of Patent: Sep. 8, 2026

(54) SPECULAR CORRECTION OF IMAGES USING AUTOENCODER NEURAL NETWORK MODEL

(71) Applicant: L&T TECHNOLOGY SERVICES LIMITED, Chennai (IN)

(72) Inventors: Sreerag Hareendranath, Kannur (IN); Akshaya Babu, Kochi (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 288 days.

(21) Appl. No.: 18/517,005

(22) Filed: Nov. 22, 2023

(65) Prior Publication Data

US 2025/0086923 A1 Mar. 13, 2025

(30) Foreign Application Priority Data

Sep. 8, 2023 (IN) ............................ 202341060789

(51) Int. Cl.
*G06V 10/25* (2022.01)
*G06T 5/20* (2006.01)
(Continued)

(52) U.S. Cl.
CPC ................ *G06V 10/25* (2022.01); *G06T 5/20* (2013.01); *G06T 7/90* (2017.01); *G06T 9/00* (2013.01);
(Continued)

(58) Field of Classification Search
CPC ................ G06T 7/90; G06T 5/20; G06T 9/00
See application file for complete search history.

(56) References Cited

U.S. PATENT DOCUMENTS 8,577,135 B2 * 11/2013 Garg ......................... G06T 5/77 382/165
8,730,356 B2 * 5/2014 Ansfield .................. G06T 5/94 348/241

(Continued)

FOREIGN PATENT DOCUMENTS

CN 113450290 A 9/2021
CN 115018727 A 9/2022
WO 2023055390 A1 4/2023

OTHER PUBLICATIONS

Ronneberger, et al, "U-Net: Convolutional Networks for Biomedical Image Segmentation", CV, 2015, pp. 1-8 (Year: 2015).*

(Continued)

*Primary Examiner* — Edward Park
(74) *Attorney, Agent, or Firm* — Kendal M. Sheets

(57) ABSTRACT

A method and a system for correcting set of input images is disclosed. The computing device receives set of input images from an imaging device. A corresponding set of corrected output images are generated based on processing of each of set of input images using pretrained and unsupervised autoencoder neural network model. For each of set of input images, the corresponding input image is encoded to generate encoded image data by extracting image parameters by set of encoding layers. The encoded image data is decoded to generate corresponding output image by set of decoding layers. Further, one or more regions of interest corresponding to specular reflection in the corresponding input image are determined by determining a noise mask. The one or more regions of interest are reconstructed in corresponding input image by predicting one or more pixels of region of interest.

17 Claims, 6 Drawing Sheets

(51) Int. Cl.
*G06T 7/90* (2017.01)
*G06T 9/00* (2006.01)
*G06V 10/56* (2022.01)
*G06V 10/60* (2022.01)

(52) U.S. Cl.
CPC .............. *G06V 10/56* (2022.01); *G06V 10/60* (2022.01); *G06T 2207/10024* (2013.01)

(56) References Cited

U.S. PATENT DOCUMENTS

| | | | | |
|---|---|---|---|---|
| 10,497,106 | B2 * | 12/2019 | Yamamoto | G06T 5/20 |
| 11,132,771 | B2 * | 9/2021 | Gordon | H04N 23/81 |
| 11,412,164 | B1 * | 8/2022 | Abreu | H04N 25/134 |
| 2016/0277694 | A1 * | 9/2016 | Lee | H04N 25/683 |

OTHER PUBLICATIONS

Xu, et al, "Highlight Removal from A Single Grayscale Image Using Attentive GAN", AAI, pp. 1-20, 2022 (Year: 2022).*

Vincent et al, "Extracting and Composing Robust Features with Denoising Autoencoders", ICML, pp. 1-8, 2008 (Year: 2008).*

Meslouhi et al, "Automatic Detection and Inpainting of Specular Reflections for Colposcopic Images", CEJCS, pp. 1-14, 2011 (Year: 2011).*

Ta-Wei Tang; Hakiem Hsu, Wei-Ren Huang, Kuan-Ming Li; Industrial Anomaly Detection with Skip Autoencoder and Deep Feature Extractor; NIH; Nov. 30, 2022.

Gabriel Eilertsen, Joel Kronanderhdr, Gyorgy Denes, Rafał K. Mantiuk, Jonas Unger; HDR image reconstruction from a single exposure using deep CNNs; ACM Transactions on Graphics; Nov. 2017; vol. 36, No. 6.

Gustav Grund Pihlgren, Fredrik Sandin, Marcus Liwicki; Pretraining Image Encoders without Reconstruction via Feature Prediction Loss; Sweden; Jul. 15, 2020.

Adam Bielski,Paolo Favaro; Move: Unsupervised Movable Object Segmentation and Detection; 36th Conference on Neural Information Processing Systems; Oct. 20, 2022.

Zhongqi Wu, Jianwei Guo, Chuanqing Zhuang, Jun Xiao, Dong-Ming Yan, Xiaopeng Zhang ; Joint specular highlight detection and removal in single images via Unet-Transformer; SpringerLink; Oct. 18, 2022; pp. 141-154; vol. 9, No. 1, Mar. 2023; China.

Minh-Trieu Tran , Soo-Hyung Kim, Hyung-Jeong Yang, Guee-Sang Lee; Multi-Task Learning for Medical Image Inpainting Based on Organ Boundary Awareness; MDPI; May 7, 2021; pp. 1 to 19; Appl. Sci. 2021, 11, 4247; Korea.

* cited by examiner

400

402 404 406

| Layer (type) | Output Shape | Param # |
|---|---|---|
| input_1 (InputLayer) | [(None, 512, 512, 3)] | 0 |
| conv2d (Conv2D) | (None, 512, 512, 512) | 14336 |
| conv2d_1 (Conv2D) | (None, 512, 512, 256) | 1179904 |
| max_pooling2d (MaxPooling2D) | (None, 256, 256, 256) | 0 |
| conv2d_2 (Conv2D) | (None, 256, 256, 128) | 295040 |
| max_pooling2d_1 (MaxPooling2 | (None, 128, 128, 128) | 0 |
| conv2d_3 (Conv2D) | (None, 128, 128, 64) | 73792 |
| max_pooling2d_2 (MaxPooling2 | (None, 64, 64, 64) | 0 |
| conv2d_4 (Conv2D) | (None, 64, 64, 32) | 18464 |
| conv2d_5 (Conv2D) | (None, 64, 64, 32) | 9248 |
| up_sampling2d (UpSampling2D) | (None, 128, 128, 32) | 0 |
| conv2d_8 (Conv2D) | (None, 128, 128, 256) | 73984 |
| up_sampling2d_3 (UpSampling2 | (None, 256, 256, 256) | 0 |
| conv2d_9 (Conv2D) | (None, 256, 256, 256) | 590080 |
| conv2d_10 (Conv2D) | (None, 256, 256, 3) | 6915 |

Total params: 2,261,763
Trainable params: 2,261,763
Non-trainable params: 0

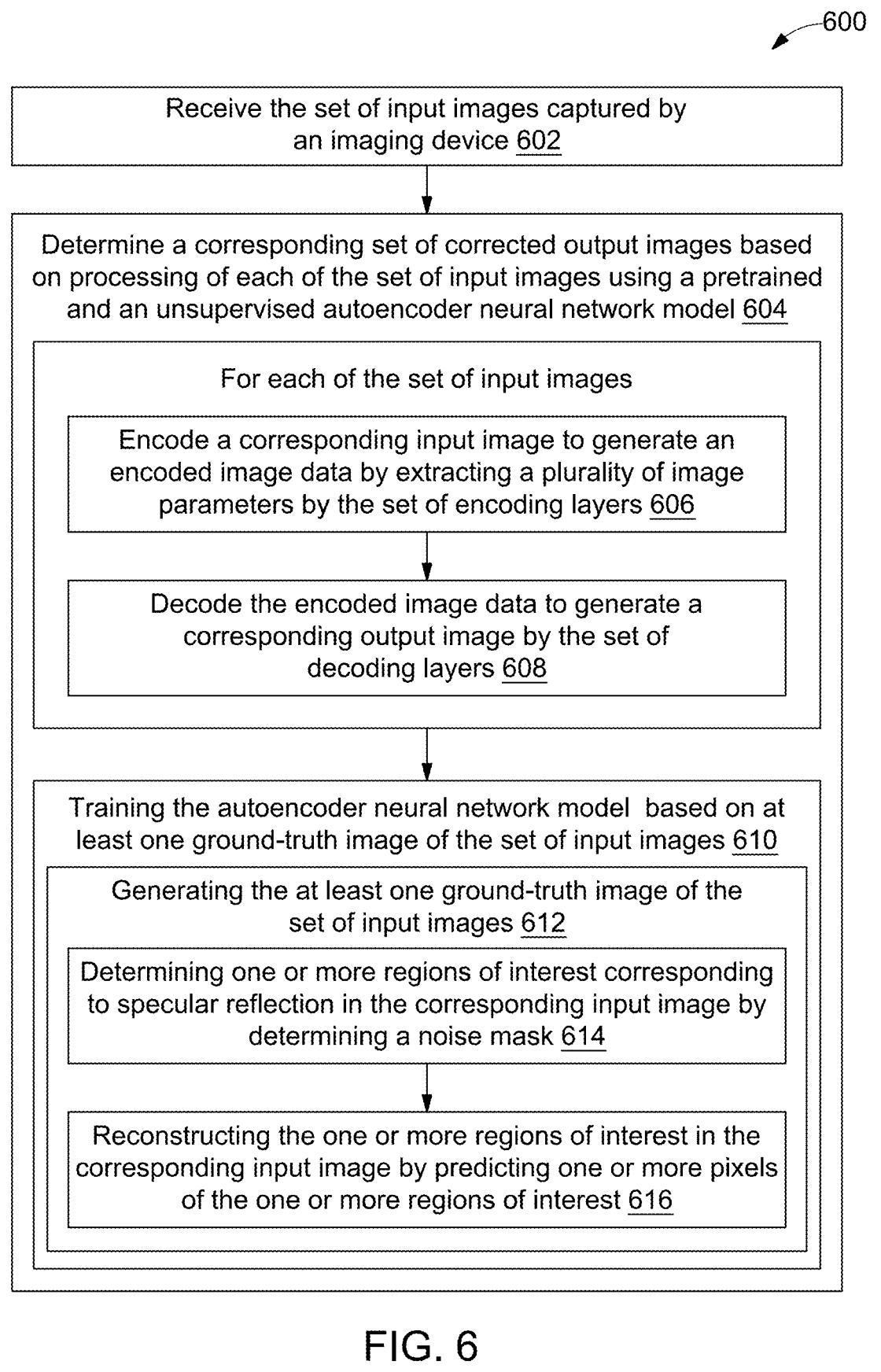

Receive the set of input images captured by an imaging device 602

Determine a corresponding set of corrected output images based on processing of each of the set of input images using a pretrained and an unsupervised autoencoder neural network model 604

For each of the set of input images

Encode a corresponding input image to generate an encoded image data by extracting a plurality of image parameters by the set of encoding layers 606

Decode the encoded image data to generate a corresponding output image by the set of decoding layers 608

Training the autoencoder neural network model based on at least one ground-truth image of the set of input images 610

Generating the at least one ground-truth image of the set of input images 612

Determining one or more regions of interest corresponding to specular reflection in the corresponding input image by determining a noise mask 614

Reconstructing the one or more regions of interest in the corresponding input image by predicting one or more pixels of the one or more regions of interest 616

FIG. 6

SPECULAR CORRECTION OF IMAGES USING AUTOENCODER NEURAL NETWORK MODEL

TECHNICAL FIELD

This disclosure relates generally to image processing, more particularly to images processing techniques using machine learning models.

BACKGROUND

Image processing has been a critical area of research and development in computer vision and various other fields. The quality of images plays a crucial role in the success of numerous applications such as object recognition, image segmentation, medical imaging, autonomous driving, and surveillance systems, to list a few among others. However, in real-world scenarios, images are often subject to various distortions and noise, therefore there is a requirement of correcting various distortions in order to effectively use the images for their intended use.

Conventional methods to correct distortions and noise have been based on simple image enhancement techniques and filtering approaches. While these methods can correct the distortions and noise such as specular reflections and mitigate their effects, they often take a lot of processing time, especially in complex scenarios with multiple sources of reflection. Additionally, these traditional approaches lack the adaptability and learning capability necessary to handle diverse and challenging scenarios effectively.

Thus, there is a need to provide a faster and an efficient system and method to correct images with specular reflections, which may cater to processing of images in real-time.

SUMMARY OF THE INVENTION

In an embodiment, a method for correcting a set of input images is disclosed. The method may include receiving, by a computing device, the set of input images captured by an imaging device. Further, the method may include determining, by the computing device, a corresponding set of corrected output images based on processing of each of the set of input images using a pretrained and an unsupervised autoencoder neural network model. In an embodiment, the autoencoder neural network model may include a set of encoding layers and a set of decoding layers. Further, for each of the set of input images, the determination of each of the corresponding set of corrected output images may include encoding, by the computing device, a corresponding input image to generate an encoded image data by extracting a plurality of image parameters by the set of encoding layers. Further, for each of the set of input images, the method may include decoding, by the computing device, the encoded image data to generate a corresponding output image by the set of decoding layers. Further, the processing of each of the set of input images to generate the corresponding set of output images may include determining, by the computing device, one or more regions of interest corresponding to specular reflection in the corresponding input image by determining a noise mask. Further, the processing of each of the set of input images to generate the corresponding set of output images may include reconstructing, by the computing device, the one or more region of interests in the corresponding input image by predicting one or more pixels of the one or more regions of interests.

In another embodiment, a system for correcting a set of input images is disclosed. The system may include a processor and a memory communicatively coupled to the processor. The memory may store processor-executable instructions, which, on execution, may cause the processor to receive the set of input images captured by an imaging device. The processor-executable instructions, on execution, further cause the processor to determine a corresponding set of corrected output images based on processing of each of the set of input images using a pretrained and an unsupervised autoencoder neural network model. In an embodiment, the autoencoder neural network model may include a set of encoding layers and a set of decoding layers. Further, for each of the set of input images, the determination of each of the corresponding set of corrected output images includes encoding a corresponding input image to generate an encoded image data by extracting a plurality of image parameters by the set of encoding layers. Further, the determination of each of the corresponding set of corrected output images may include decoding the encoded image data to generate a corresponding output image by the set of decoding layers. In an embodiment, the processing of each of the set of input images to generate the corresponding set of corrected output images, may include the processor to determine one or more regions of interest corresponding to specular reflection in the corresponding input image by determining a noise mask. The processor-executable instructions may further reconstruct the one or more region of interests in the corresponding input image by predicting one or more pixels of the one or more region of interests.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates a model summary of the exemplary autoencoder neural network model, in accordance with an embodiment of the current disclosure.

FIG. 6 illustrates a flowchart of a method for correcting the specular reflections in an image using the autoencoder neural network model, in accordance with an embodiment of the current disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
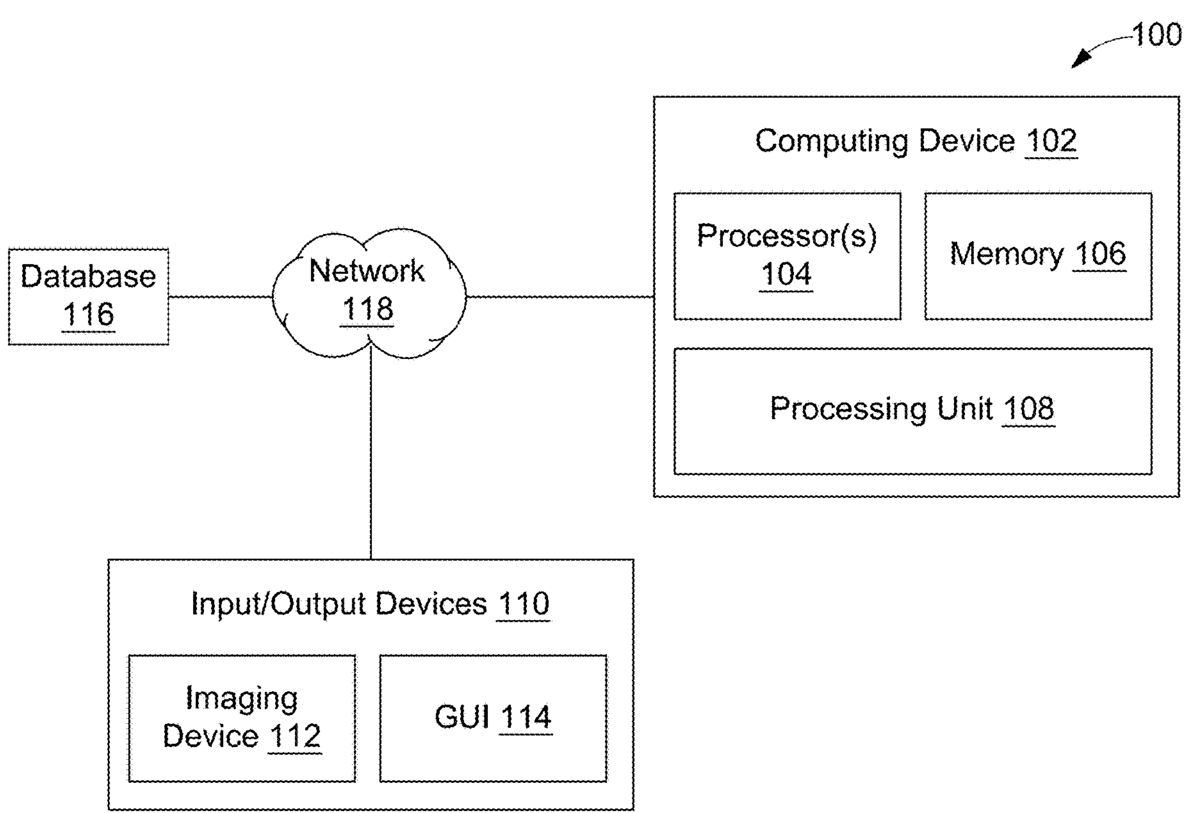
FIG. 1 illustrates a block diagram of an image processing system, in accordance with an embodiment of the present disclosure.

Referring to FIG. 1, a block diagram of an image processing system 100 is illustrated, in accordance with some embodiment of the current disclosure. The image processing system 100 may include computing device 102, an input/output device 110, a database 116 each communicably coupled to each other through a wired or a wireless communication network 118. The computing device 102 may include a processor 104, a memory 106 and a processing unit 108. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system-on-a-chip processors or other future processors. The memory 106 may store instructions that, when executed by the processor 104, cause the processor 104 to correct a set of input images. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the input/output device 110 may include an imaging device and a Graphical User Interface (GUI) 114. In an embodiment, the imaging device 112 may capture a set of input images. In an embodiment, the imaging device 112 may include one or more imaging sensors which may capture a set of input images. In some embodiments, the imaging device 112 may capture set of input images in real-time and transmit the set of input images to the computing device 102 via the network 118. In an embodiment, the imaging device 112 may be, but not limited to a handled camera, a mobile phone, a medical thermal cameras, a surveillance camera, or any other image capturing device. In an embodiment, the imaging device 112 may be provided on a medical device for performing one or more invasive medical procedures, such as, but not limited to, endoscopy, colonoscopy, etc. Accordingly, the imaging device 112 may capture the set of input images while performing an invasive medical procedure. The GUI 114 may render the output generated by the computing device 102. The GUI 114 may be, but not limited to a display, a PC, any handheld device, or any other device with a digital screen. Further, the input/output device 110 may be connected to the database 118 and the computing device 102 via the network 118.

In an embodiment, the database 118 may be enabled in a cloud or physical database comprising data such as configuration information of the computing device 102. In an embodiment, the database 118 may store data inputted or generated by the computing device 102.

In an embodiment, the communication network 118 may be a wired or a wireless network or a combination thereof. The network 118 can be implemented as one of the different types of networks, such as but not limited to, ethernet IP network, intranet, local area network (LAN), wide area network (WAN), the internet, Wi-Fi, LTE network, CDMA network, 5G and the like. Further, network 118 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, network 118 can include a variety of network devices, including routers, bridges, servers, computing devices, storage devices, and the like.

In an embodiment, the computing device 102 may be computing systems, including but not limited to, a smart phone, a laptop computer, a desktop computer, a notebook, a workstation, a portable computer, a personal digital assistant, a handheld, or a mobile device. In an embodiment, the processing unit 108 may be implemented on the computing device 102 and the processor 104 may enable correction of the set of input images using a pretrained and an supervised autoencoder neural network model.

In an embodiment, the autoencoder neural network model may be an artificial neural network used to learn efficient coding of unlabeled data. Further, the autoencoder neural network model may be very efficient in data compression, feature extraction, and reconstruction processes in various domains of image processing. The autoencoder neural network model may be a neural network that may be trained unsupervised. In simpler words, the autoencoder neural network model may be trained by the unlabeled input fed to the neural network. The autoencoder neural network model may train itself by recognizing patterns in the unlabeled set of input images. Further, the autoencoder neural network model may include a plurality of functions, an encoding function, and a decoding function. The encoding function may encode and compress the unlabeled input by a plurality of layer of Convolutional neural networks (CNN) and the decoding function may decode and decompress the unlabeled input by the plurality of layers of CNN's as explained in detail below.

In an embodiment, the computing device 102 of the system 100 may receive the set of input images captured by the imaging device 112. In an embodiment, the imaging device 112 may capture the set of input images while performing an invasive medical procedure using a medical device or an invasive medical device. Further, the computing device 102 may determine a corresponding set of corrected output images based on processing of each of the set of input images using a pretrained and an unsupervised autoencoder neural network model. In an embodiment, the set of input images may include one or more regions of interests corresponding to specular reflections which may be corrected using the autoencoder neural network model. Further, the autoencoder neural network model may include a set of encoding layers and a set of decoding layers. The encoding layers may enable the encoding function of the autoencoder neural network model and the decoding layer may enable the decoding function of the autoencoder neural network model.

In some embodiments, the determination of each of the corresponding set of corrected output images may include a plurality of processing steps performed by the autoencoder neural network model. In an embodiment, for each of the set of input images the autoencoder neural network model may encode a corresponding input image to generate an encoded image data by extracting a plurality of image parameters by the set of encoding layers. Further, the autoencoder neural network model may decode the encoded image data to generate a corresponding output image by the set of decoding layers. Furthermore, the processing of each of the set of input images to generate the corresponding set of corrected output images may include the computing device 102 to determine one or more regions of interest corresponding to specular reflections in the corresponding input image based on determination of a noise mask. Further, the processing of each of the set of input images to generate the corresponding set of corrected output images may include the computing device 102 to reconstruct the one or more regions of interest in the corresponding input image by predicting one or more pixels of the one or more regions of interest.

Figure 2:
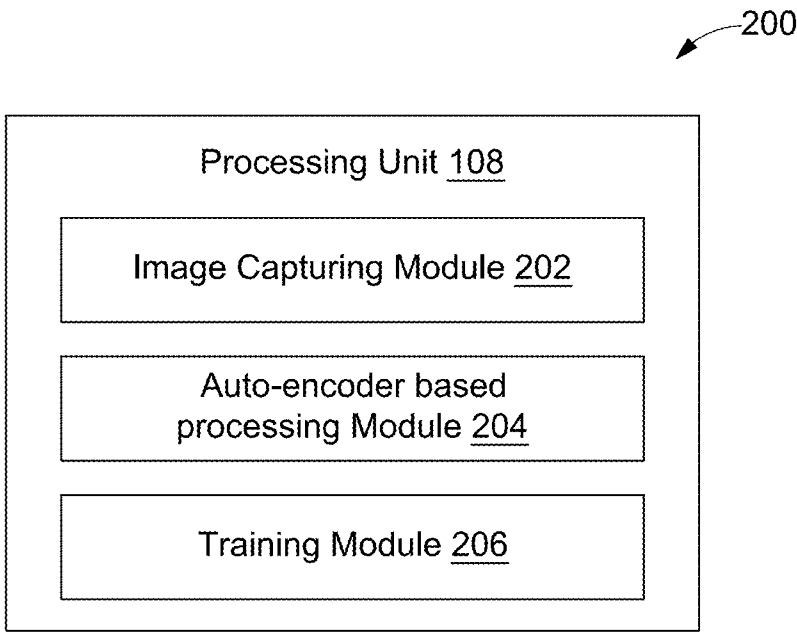
FIG. 2 illustrates a functional block diagram of the processing unit, in accordance with an embodiment of the current disclosure.

Referring now to FIG. 2, a functional block diagram of the processing unit 108 is illustrated, in accordance with an embodiment of current disclosure. The processing unit 108 may include an image capturing module 202, an autoencoder based processing module 204, and a training module 210. Further, the autoencoder based processing module 204 may include a noise mask generation module 206, and an image reconstruction module 208. FIG. 2 is explained in conjunction with the description of FIG. 1.

In some embodiments, the image capturing module 202 of the processing unit 108 may capture the set of input images which may include specular reflections. In an embodiment, the specular reflections may be the mirror-like reflections at the air-surface interface that may occur when the incident light is reflected from a smooth surface. The image capturing module 202 may also receive the set of input images from the imaging devices 112. The image capturing module 202 may extract each of the set of input images as frames of a video being captured by the imaging device 112.

Figure 3:
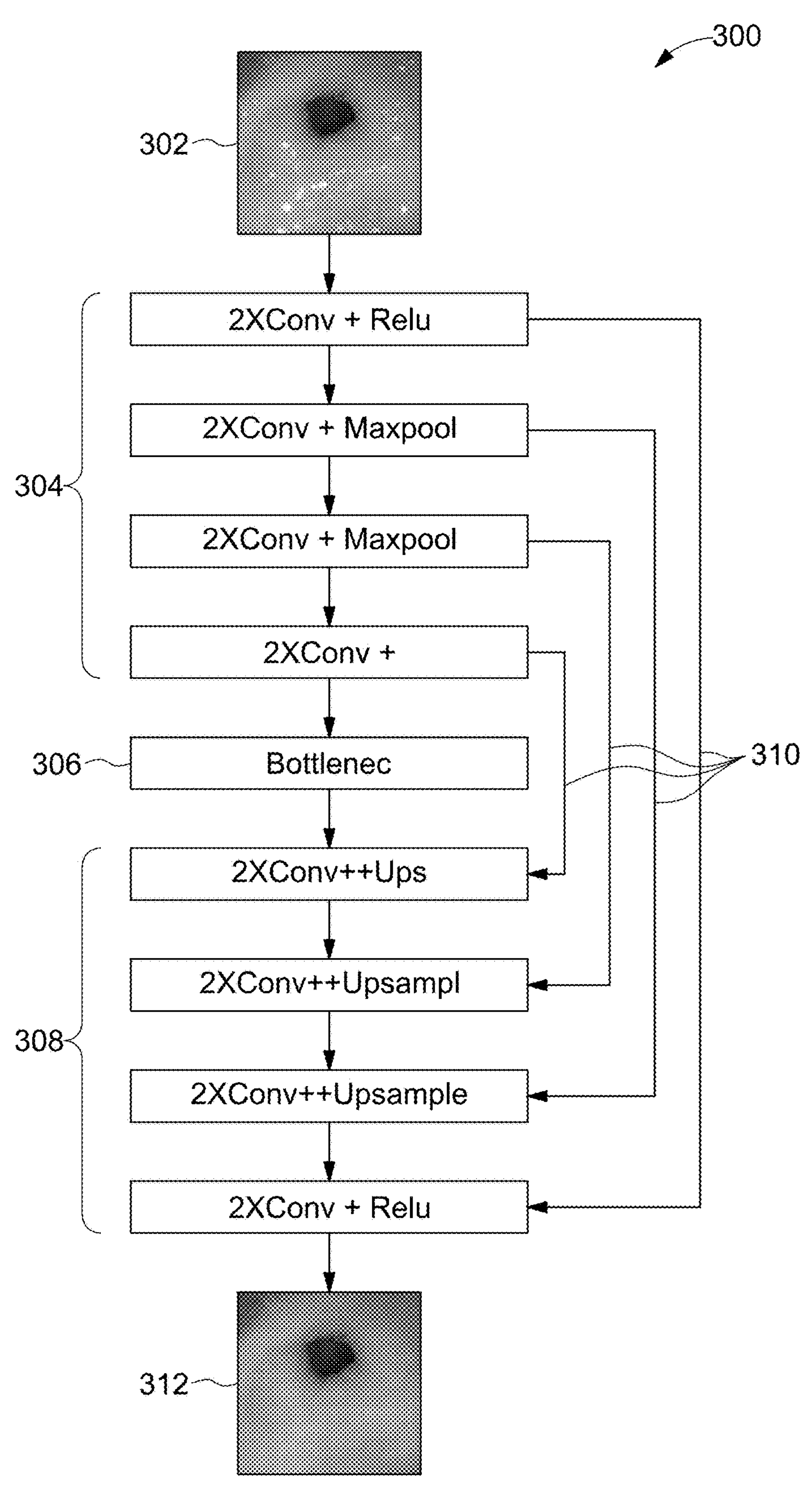
FIG. 3 illustrates an exemplary autoencoder neural network model, in accordance with an embodiment of the current disclosure.

Further, the autoencoder based processing module 204 of the processing unit 108 may correct the set input images to remove specular reflections in each of the set of input images. The autoencoder based processing module 204 may receive each of the set of input images from the image capturing module 202 of the processing unit 108. In an embodiment, each frame of the video being captured may be corrected by the autoencoder based processing module 204. The autoencoder based processing module 204 may use an unsupervised autoencoder neural network model to correct each of the set of input images. Referring now to FIG. 3, an exemplary autoencoder neural network model 300 is depicted, in accordance with an embodiment of the present disclosure. In an embodiment, the autoencoder neural network model 300 may include a set of encoding layers 302, a bottleneck layer 306, a set of decoding layers 308. The set of encoding layers 302 and the set of decoding layers 308 may be convolutional layers. The set of encoding layers 302 may generate encoded image data by extracting a plurality of image parameters. In an embodiment, the set of encoding layers 302 may be maxpooling layer that may compress the image data of the input image 300 in the bottleneck layer 306 to generate encoded image data of a predefined dimension. In an embodiment, the bottleneck layer 306 may be a compressed representation of input images 330 in a reduced-dimensional space, also known as a latent space. The bottleneck layer 306 may learn a compressed representation of the set of input images 330 while capturing the essential features and discarding unnecessary details of the set of input images 330. The bottleneck layer may have fewer plurality of nodes than the encoding layers 304 and the decoding layers 308. It should be noted that the bottleneck layer 306 may restrict the flow of information to the decoding layer 308 from the encoding layer 304 and may allow only the most vital information to pass through.

The set of encoding layers 302 and the set of decoding layers 308 may use convolution operators to convolute an input image 330 from the set of input images and saves the convolution results to different channels of the convolution layers. In some embodiments, the encoding layers 304 may be communicatively connected with the corresponding decoding layers 308 via the skip connections 310. The model 300 may learn to generate the corrected images based on the skip connection 310 by learning the lost information during maxpooling of the input image 300 by the set of encoding layers 304. Further, for each of the set of encoding layers 304 there is a corresponding decoding layer in the set of decoding layers 308. Accordingly, the input image 330 may be encoded by the set of encoding layers 302 to generate encoded image data that may be decoded by the set of decoding layers 306 to generate corrected image data using the image feature data. In an embodiment, the set of decoder layers 308 may upsample the compressed encoded image data generated by the set of encoding layers 304. In an embodiment, the autoencoder model 300 learns to encode the image data efficiently so that the set of decoding layers 306 can convert it back to the corrected image data devoid of specular reflections.

In some embodiments, the encoding layers 304 of the autoencoder neural network model 300 may include a plurality of functions to extract the features from the set of input images 330, and compress the set of input images 330. The plurality of functions may be a Rectified Linear activation (ReLu) function and a Max pooling function. The ReLu function may be an activation function implemented in the input layer of the encoding layer 304. In an embodiment, the ReLu function may introduce non-linearity in the autoencoder neural network model 300 by selecting the maximum value of the input dataset. The ReLu function may be expressed as;

$$f(x)=\max(0,x)$$

where $x$ = an input value

In some embodiments, the output of ReLu is the maximum value between zero and the input value. An output is equal to zero when the input value is negative and the input value when the input is positive. Thus, we can rewrite the above equation as follows:

$$f(x)=(0,\text{ if } x<0 \text{ and } x,\text{ if } x>=0) \text{ where } X=\text{an input value}$$

Further, the ReLu function may be able to accelerate the training speed of the autoencoder neural network model 300 in comparison to traditional activation function. Since, the derivative of ReLu function is 1 for a positive input. Due to a constant, the autoencoder neural network model 300 may not need to take additional time for computing error terms during a training phase.

A pooling operation includes sliding a two-dimensional filter over each channel of feature map and summarizing the features lying within the region covered by the filter. In some embodiments, the Max pooling function of the encoding layers 304 may be a pooling operation that may select the maximum element from the region of the feature map of the input images 330 covered by a filter. In simpler words, the output after max-pooling layer may be a feature map consisting of the most prominent features of the previous feature map. The Max pooling operation may reduce the dimension of the feature map resulting in a decrease of the number of parameters to learn and the amount of computation performed in the autoencoder neural network model. In some embodiments, the max pooling layer summarizes the features present in a region of the feature map generated by the encoding layer 304. So, further operations may be performed on summarized features instead of precisely positioned features generated by the encoding layer 304. This may make the autoencoder neural network model 300 more robust to variations in the position of the features in the input image 330.

In some embodiments, the decoding layers 308 of the autoencoder neural network model 300 may include a plurality of function to reconstruct the extracted features from each of the set of input images 330, and decompress each of the set of input images 330. The plurality of functions may be the Rectified Linear activation (ReLu) function and a Up sampling function. In some embodiments, the Up sampling function may be a deconvolution layer which performs the inverse of the Max pooling function of the encoding layer 304. The Up sampling function may reconstruct the spatial information which may be lost during the operation of the max pooling function in the autoencoder neural network model 300. The Up sampling function may decompress and reconstruct the input images 330 by performing the reverse of the Max pooling function.

In some embodiments, the autoencoder neural network model 300 may be an unsupervised trained neural network model. Further, the autoencoder neural network model 300 may be trained by backpropagating 312 the mean square error of the output images from the output layer to the input layer of the autoencoder neural network model 300 as explained in detail below.

Further, the autoencoder based processing module 204 may implement an unsupervised neural network 300 as described in FIG. 3, to correct the specular reflections in each of the set of input images. In some embodiments, the autoencoder neural network model 300 may process each of the set of input images to generate the corresponding set of corrected output images by determining one or more regions of interest corresponding to specular reflection in the corresponding input image. In an embodiment, the one or more regions of interest corresponding to specular reflection may be determined by determining a noise mask. The determination of noise mask may include enhancing the corresponding input image from the set of input images using a non-linear filtering technique. Further, the determination of noise mask may include determining a color space of the corresponding input image and converting the color space of the corresponding input image to an XYZ color space. Upon conversion to the XYZ color space, a normalized image may be generated by normalizing each of a plurality of pixels of the of the input image in the XYZ color space based on a predefined normalization threshold range. Further, a luminance value of each of the plurality pixels of the corresponding input image may be determined. The noise mask may be generated based on the luminance value of each of the plurality pixels of the normalized image and the input image in the XYZ color space.

In some embodiments, the autoencoder based processing module 204 may reconstruct the one or more regions of interest in the corresponding input image by predicting one or more pixels of the one or more regions of interest. In an embodiment, the noise mask generated may reconstruct the one or more regions of interest in the corresponding input image corresponding to specular reflections by predicting one or more pixels of the one or more regions of interest. In an embodiment, the one or more pixels of the one or more region of interests may be predicted based on determination of a comparison between the one or more pixels of the one or more region of interests and one or more neighboring pixels of the one or more pixels of the one or more region of interests in the corresponding input image.

In an embodiment, the training module 206 of the processing unit 108 may train the autoencoder based neural network model implemented by the autoencoder based processing module 204. The training of the neural network model may be unsupervised due to the unlabeled input dataset being fed to the system 100. The training of the autoencoder neural network model may include determining a mean square error of the corresponding set of output images. The mean square error of the corresponding set of output images may signify the change in the output image corresponding to the input image that may be processed by the system 100. In an embodiment, the mean square error may be calculated between the output image with reconstructed one or more regions of interest corresponding to the specular reflections and ground truth image i.e. a corresponding image without the specular reflection. Accordingly, based on the mean square error the model may learn to generate output image devoid of specular reflections. The training module 206 may train the autoencoder based neural network model by backpropagating the mean square error to optimize the set of decoding layers and the set of encoding layers. Accordingly, weights and biases of each of the layers of the autoencoder based neural network model may be updated.

Referring now to FIG. 4, a model summary table 400 of the exemplary autoencoder neural network model 300 is illustrated, in accordance with an embodiment of the current disclosure. The model summary table 400 depicts a layer type 402, an output shape 404, and a number of parameters 406. In an embodiment, the layer type 402 may represent the type of layer of the autoencoder neural network model 300. The layer type 402 may be arranged in an order of their occurrence in the autoencoder neural network model 300, a row in the order of encoding layer 304 and decoding layer 308. Further, the output shape 404 may represent the shape of the input image 330 after being processed by each of the corresponding layer type 402. In an exemplary embodiment, the number of parameters 406 may be defined as the learnable weights and biases that the autoencoder network model 300 adjusts during the training process to optimize its performance a specific task. The output shape 404 corresponding to each of the layer type 402 may be represented in the format [height, width, channels]. The output shape 404 corresponds to the layer type 402 conv2D layer may be represented in the format [output height, output width, channels)]. In an embodiment, the output height may correspond to layer type 402 "conv2D" may be determined based on following formula:

$$\text{output height} = (\text{input height} - \text{kernel height} + 2 * \text{padding})/\text{stride} + 1$$

In an embodiment, the output width corresponding to layer type 402 "conv2D" may be determined based on following formula:

$$\text{output width} = (\text{input width} - \text{kernel width} + 2 * \text{padding})/\text{stride} + 1$$

In an embodiment, the output shape 404 corresponding to the layer type 402 "maxpooling2D" layer may be represented in the format [output height, output width, channels)]. The output height corresponds to layer type 402 "maxpooling2D" may be determined based on following formula:

$$\text{output height} = (\text{input height} - \text{pooling window height})/\text{stride} + 1$$

In an embodiment, the output width corresponds to layer type 402 "maxpooling2D" may be determined based on following formula:

$$\text{output width} = (\text{input width} - \text{pooling window width})/\text{stride} + 1$$

In an embodiment, the output shape 404 corresponds to the layer type 402 "upsampling2D" may be represented in the format [output height, output width, channels)]. The output height corresponds to layer type 402 "upsampling2D" may be determined based on following formula:

$$\text{output height} = \text{input height} * \text{scaling factor}$$

In an embodiment, the output width corresponds to layer type 402 "maxpooling2D" may be determined based on following formula:

$$\text{output width} = \text{input width} * \text{scaling factor}$$

In an exemplary embodiment, kernel height and kernel width may be defined as the dimensions of the convolutional filter used in the layer. In an embodiment, padding may add extra border pixels to the input. In an embodiment, stride may determine how much the convolutional kernel moves during each step of the convolution operation. In an embodiment, the pooling window height and width may be defined as the dimension of the pooling window used in the layer. In an embodiment, the scaling factor may be defined as the factor by which the dimensions of the input feature map may be increased during up sampling.

Figure 5:
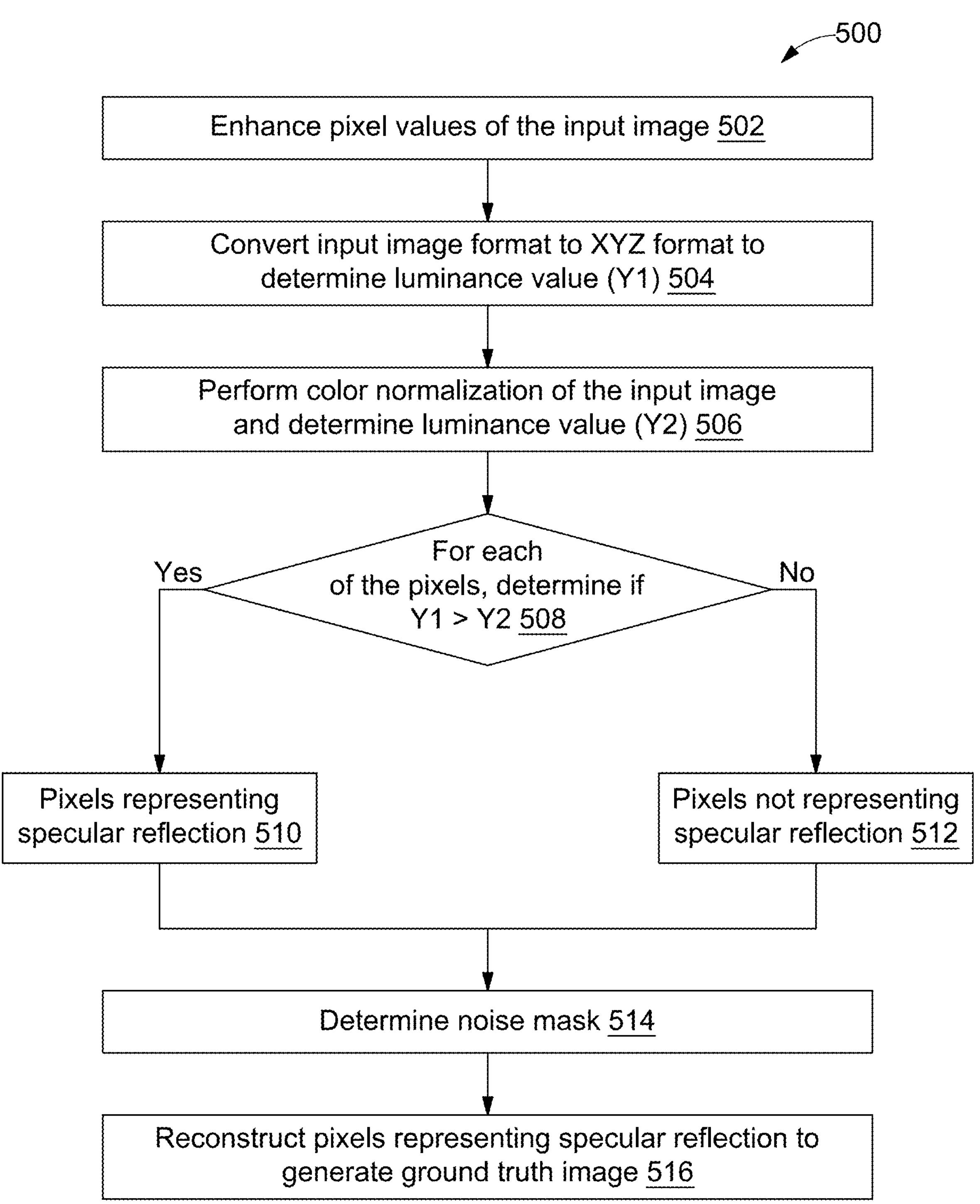
FIG. 5 illustrates a flowchart of a method generating corrected output image various by the autoencoder neural network model to generate using a noise mask, in accordance with an embodiment of the current disclosure.

Referring now to FIG. 5, a flowchart 500 depicting a method of generating corrected output image various by the autoencoder neural network model to generate using a noise mask, in accordance with an embodiment of the present disclosure. The autoencoder neural network model 300, may perform a plurality of operations to correct the specular reflection in the set of input images 330. In some embodiments, some of the operations may be performed independently of the autoencoder neural network model 300. In order for the computing device 102 to correct the specular reflections in an input image 300 from the set of input images, one or more regions of interest corresponding to specular reflection may be determined by determining a noise mask. In an embodiment, the computing unit 102 may perform the operations iteratively on each of the set of input images to generate corrected output images devoid of specular reflections.

At step 502, the computing device 102 may enhance the input image 302 from the set of input images to differentiate between an appearance of pale-colored tissue and the specular light reflections. In order to perform enhancement of the input a non-linear filter may be applied to the input image 330 of the set of input images to amplify the pixel values in order to enhance the difference between the pixels representing the tissue and the specular reflections. In an embodiment, the non-linear function applied to the input image may be depicted as following equation (1).

$$\begin{pmatrix} R' \\ G' \\ B' \end{pmatrix} = \frac{\min(R, G, B)}{\max(R, G, B)} \begin{pmatrix} R \\ G \\ B \end{pmatrix} \tag{1}$$

At step 504, the computing device 102 may convert the input image 302 from a CIE-RGB to CIE-XYZ format. Accordingly, a first luminance value (Y1) of each pixel may be determined of the input image 330 based on the following equation (2).

$$Y1 = w1 \times R + w2 \times G + w3 \times B \tag{2}$$

In an embodiment, the weights w1, w2 and w3 may be determined based on experimentation. In an exemplary embodiment, w1=0.2126, w2=0.7152, w3=0.0722.

Further, at step 506, color normalization may be performed by the computing device 102, on the input image which may compensate for the variations due to lighting, cameras, or other factors on the input image 330. In an embodiment, color normalization may be performed for the input image in RGB format, by dividing each pixel's value by sum of the pixel's value over each of the channels. Accordingly, for a pixel with intensities R, G, and B in a respective channels, the normalized values may be determined R/S, G/S and B/S (where, S=R+G+B). Further, a second luminance (Y2) value of each pixel of the normalized input image may be determined.

At step 508, the computing device 102 may compare if the first luminance value (Y1) is greater than the second luminance value (Y2) of each of the plurality of pixels of the corresponding input image.

In case, the first luminance value (Y1) of a pixel of the corresponding input image is greater than the second luminance value (Y2) of the corresponding pixel in the normalized input image at step 508, the computing device 102 may determine that the corresponding pixel representing specular reflection at step 510. Further, if the first luminance value (Y1) of a pixel of the corresponding input image is determined less than the second luminance value of the corresponding pixel in the normalized input image, at step 508, the computing device 102 may determine that the corresponding pixel is not representative of specular reflection at step 512.

At step 514, a noise mask may be determined by the computing device 102 based on the determination of the pixels representing the specular reflection at steps 508. Accordingly, one or more regions of interest corresponding to specular reflection may be determined.

At step 516, the computing device 102 may reconstruct the pixels of the one or more region of interest based on the determined noise mask. In an embodiment, the reconstruction of the pixels of the one or more regions of interest may be performed based on reconstruction technique such as but not limited to, inpainting technique. In an embodiment, the inpainting technique may predict the pixels of the one or more regions of interest based on determination of a comparison between the one or more pixels of the one or more regions of interest and one or more neighboring pixels corresponding to the one or more pixels of the one or more regions of interest. Accordingly, the pixels of the one or more regions of interest may be replaced by the predicted pixel values based on the inpainting technique.

Referring now to FIG. 6, a method for correcting the specular reflections in an input image using the autoencoder neural network model is disclosed via a flowchart 600, in accordance with an embodiment of the current disclosure. FIG. 6 is explained in conjunction with FIGS. 1-5. Each step of the flowchart 600 may be executed by various modules of FIG. 2.

At step 602, the computing device 102 may receive set of input images captured by an imaging device. Further, at step 604, the computing device 102 may determine a corresponding set of corrected output images based on processing of each of the set of input images using a pretrained and an unsupervised autoencoder neural network model. In an embodiment, the autoencoder neural network model may include a set of encoding layers and a set of decoding layers.

Further, at step 606, for each of the set of input images, the determination of each of the corresponding set of corrected output images may include encoding a corresponding input image to generate an encoded image data by extracting a plurality of image parameters by the set of encoding layers.

Further, at step 608, for each of the set of input images, the determination of each of the corresponding set of corrected output images may include decoding the encoded image data to generate a corresponding output image by the set of decoding layers. In an embodiment, each of the set of encoding layers may correspond to one of the set of decoding layers via a skip connection.

Further, the processing of each of the set of input images to generate the corresponding set of corrected output images at step 602 may include determining, by the computing device 102, one or more regions of interest corresponding to specular reflection in the corresponding input image based on determination of a noise mask.

Further, the processing of each of the set of input images to generate the corresponding set of corrected output images may include reconstructing, by the computing device 102, the one or more region of interests in the corresponding input image by predicting one or more pixels of the one or more region of interests. The one or more pixels of the one or more region of interests may be predicted based on determination of a comparison between the one or more pixels of the one or more region of interests and one or more neighboring pixels of the one or more pixels of the one or more region of interests.

Thus, the disclosed method and system try to overcome the technical problem of slow pre-processing of the images to correct the specular reflections. The method and system provide means to correct the specular reflections in the image frames being captured by an imaging device in a faster and efficient manner. Further, the method and system may cater to plurality of applications of the image pre-processing. Further, the method and system provide a means to extract the features and parameters of the images and process them to eliminate noise and distortions. Further, the method and system may deploy the autoencoder neural network model to cater to the faster processing of the images which may be done in real-time. The method and system may be deployed in the medical imaging techniques such as colonoscopy and endoscopy to efficiently diagnose and classify the polyps inside the body cavities. Further, the method and system may be deployed in the surveillance and security purposes by eliminating the noise and distortions from the CCTV footages.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

It is intended that the disclosure and examples be considered as exemplary only, with a true scope of disclosed embodiments being indicated by the following claims

What is claimed is:

1. A method for correcting a set of input images, the method comprising:

receiving, by a computing device, the set of input images captured by an imaging device; and determining, by the computing device, a corresponding set of corrected output images based on processing of each of the set of input images using a pretrained and an unsupervised autoencoder neural network model, wherein the autoencoder neural network model comprises a set of encoding layers and a set of decoding layers, and wherein the determination of each of the corresponding set of corrected output images comprises:

for each of the set of input images:

encoding, by the computing device, a corresponding input image to generate encoded image data by extracting a plurality of image parameters by the set of encoding layers, and decoding, by the computing device, the encoded image data to generate a corresponding output image by the set of decoding layers, and wherein the processing of each of the set of input images to generate the corresponding set of corrected output images, comprises:

determining, by the computing device, one or more regions of interest corresponding to specular reflection in the corresponding input image by determining a noise mask, and reconstructing, by the computing device, the one or more regions of interest in the corresponding input image by predicting one or more pixels of the one or more regions of interest.

2. The method as claimed in claim 1, wherein each of the set of encoding layers corresponds to one of the set of decoding layers via a skip connection, wherein each of the set of encoding layers generates a compressed image of the corresponding input image, and wherein the corresponding one of the set of decoding layers generates a de-compressed image of the corresponding compressed image based on the skip connection.

3. The method of claim 1, wherein the determination of the noise mask comprises:

enhancing, by the computing device, the corresponding input image using a non-linear filtering technique;

determining, by the computing device, a color space of the corresponding input image and converting the color space of the corresponding input image to an XYZ color space;

upon conversion to the XYZ color space, generating, by the computing device, a normalized image by normalizing each of a plurality of pixels of the corresponding input image based on a predefined normalization threshold range; and determining, by the computing device, a luminance value of each of the plurality pixels of the corresponding input image.

4. The method of claim 3, wherein the determination of the one or more pixels of the one or more regions of interest is based on a comparison of the luminance value of each of the plurality of pixels of the corresponding input image with a luminance value of the normalized image.

5. The method of claim 1, comprises training the autoencoder neural network model by:

determining, by the computing device, a mean square error of each of the corresponding set of corrected output images based on corresponding set of ground truth images; and backpropagating, by the computing device, the mean square error to optimize the set of decoding layers and the set of encoding layers.

6. The method of claim 1, wherein the one or more pixels of the one or more regions of interest are predicted based on determination of a comparison between the one or more pixels of the one or more regions of interest and one or more neighboring pixels corresponding to the one or more pixels of the one or more regions of interest.

7. A system for correcting a set of input images, comprising:

a processor; and a memory communicably coupled to the processor, wherein the memory stores processor-executable instructions, which, on execution by the processor, cause the processor to:

receive the set of input images captured by an imaging device; and determine a corresponding set of corrected output images based on processing of each of the set of input images using a pretrained and an unsupervised autoencoder neural network model, wherein the autoencoder neural network model comprises a set of encoding layers and a set of decoding layers, and wherein the determination of each of the corresponding set of corrected output images comprises: for each of the set of input images:

encoding a corresponding input image to generate an encoded image data by extracting a plurality of image parameters by the set of encoding layers, and decoding the encoded image data to generate a corresponding output image by the set of decoding layers, and wherein the processing of each of the set of input images to generate the corresponding set of corrected output images, comprises:

determine one or more regions of interest corresponding to specular reflection in the corresponding input image by determining a noise mask, and reconstruct the one or more regions of interest in the corresponding input image by predicting one or more pixels of the one or more regions of interest.

8. The system of claim 7, wherein each of the set of encoding layers corresponds to one of the set of decoding layers via a skip connection, wherein each of the set of encoding layers generates a compressed image of the corresponding input image, and wherein the corresponding one of the set of decoding layers generates a de-compressed image of the corresponding compressed image based on the skip connection.

9. The system of claim 7, wherein the processor-executable instructions cause the processor to determine the noise mask by:

enhancing the corresponding input image using a non-linear filtering technique;

determining a color space of the corresponding input image and converting the color space of the corresponding input image to an XYZ color space;

upon conversion to the XYZ color space, generating a normalized image by normalizing each of a plurality of pixels of the corresponding input image based on a predefined normalization threshold range; and determining a luminance value of each of the plurality pixels of the corresponding input image.

10. The system of claim 9, wherein the determination of the one or more pixels of the one or more regions of interest is based on a comparison of the luminance value of each of the plurality of pixels of the corresponding input image with a luminance value of the normalized image.

11. The system of claim 7, wherein the processor-executable instructions further cause the processor to train the autoencoder neural network model by:

determining a mean square error of the corresponding set of output images; and backpropagating the mean square error to optimize the set of decoding layers and the set of encoding layers.

12. The system of claim 7, wherein the processor-executable instructions further cause the processor to predict the one or more pixels of the one or more regions of interest based on determination of a comparison between the one or more pixels of the one or more regions of interest and one or more neighboring pixels of the one or more pixels of the one or more regions of interest.

13. A non-transitory computer-readable medium storing computer-executable instructions for correcting a set of input images, the computer-executable instructions configured for:

receiving the set of input images captured by an imaging device; and determining a corresponding set of corrected output images based on processing of each of the set of input images using a pretrained and an unsupervised autoencoder neural network model, wherein the autoencoder neural network model comprises a set of encoding layers and a set of decoding layers, and wherein the determination of each of the corresponding set of corrected output images comprises:

for each of the set of input images:

encoding a corresponding input image to generate encoded image data by extracting a plurality of image parameters by the set of encoding layers, and decoding the encoded image data to generate a corresponding output image by the set of decoding layers, and wherein the processing of each of the set of input images to generate the corresponding set of corrected output images, comprises:

determining one or more regions of interest corresponding to specular reflection in the corresponding input image by determining a noise mask, and reconstructing the one or more regions of interest in the corresponding input image by predicting one or more pixels of the one or more regions of interest.

14. The non-transitory computer-readable medium of claim 13, wherein each of the set of encoding layers corresponds to one of the set of decoding layers via a skip connection, wherein each of the set of encoding layers generates a compressed image of the corresponding input image, and wherein the corresponding one of the set of decoding layers generates a de-compressed image of the corresponding compressed image based on the skip connection.

15. The non-transitory computer-readable medium of claim 13, wherein the computer-executable instructions configured to determine the noise mask by:

enhancing the corresponding input image using a non-linear filtering technique;

determining a color space of the corresponding input image and converting the color space of the corresponding input image to an XYZ color space;

upon conversion to the XYZ color space, generating, by the computing device, a normalized image by normalizing each of a plurality of pixels of the corresponding input image based on a predefined normalization threshold range; and determining a luminance value of each of the plurality pixels of the corresponding input image.

16. The non-transitory computer-readable medium of claim 13, wherein the compute-executable instructions configured for:

training the autoencoder neural network model by:

determining a mean square error of each of the corresponding set of corrected output images based on corresponding set of ground truth images; and backpropagating the mean square error to optimize the set of decoding layers and the set of encoding layers.

17. The non-transitory computer-readable medium of claim 13, wherein the one or more pixels of the one or more regions of interest are predicted based on determination of a comparison between the one or more pixels of the one or more regions of interest and one or more neighboring pixels corresponding to the one or more pixels of the one or more regions of interest.

* * * * *